(12) United States Patent
Chen et al.

(10) Patent No.: US 12,436,689 B1
(45) Date of Patent: Oct. 7, 2025

(54) MEMORY DEVICE AND DETECTION METHOD FOR DEFEATED STATUS OF MEMORY CELL

(71) Applicant: MACRONIX International Co., Ltd., Hsinchu (TW)

(72) Inventors: Wei-Han Chen, Tainan (TW); Yih-Shan Yang, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 0 days.

(21) Appl. No.: 18/761,320

(22) Filed: Jul. 2, 2024

(51) Int. Cl.
*G06F 3/06* (2006.01)

(52) U.S. Cl.
CPC .......... *G06F 3/0619* (2013.01); *G06F 3/0653* (2013.01); *G06F 3/0656* (2013.01); *G06F 3/0679* (2013.01)

(58) Field of Classification Search
CPC .... G06F 3/0619; G06F 3/0653; G06F 3/0656; G06F 3/0679
USPC .......................................................... 711/103
See application file for complete search history.

(56) References Cited

U.S. PATENT DOCUMENTS

| | | | |
|---|---|---|---|
| 7,296,128 B2 | 11/2007 | Lee | |
| 2010/0027339 A1* | 2/2010 | Ho | G11C 11/5642 365/185.12 |
| 2012/0092932 A1 | 4/2012 | Sarin et al. | |
| 2016/0372186 A1 | 12/2016 | You | |
| 2017/0102977 A1* | 4/2017 | Yang | G06F 3/0656 |
| 2020/0027510 A1 | 1/2020 | Kim et al. | |
| 2022/0076767 A1* | 3/2022 | Guo | G11C 16/24 |
| 2022/0093192 A1* | 3/2022 | Choi | G11C 16/3404 |
| 2022/0336006 A1* | 10/2022 | Huang | G11C 16/0483 |
| 2023/0004647 A1* | 1/2023 | Okada | G06N 20/00 |

FOREIGN PATENT DOCUMENTS

| | | |
|---|---|---|
| TW | 201503151 | 1/2015 |
| WO | 2015013689 | 1/2015 |
| WO | 2016048846 | 3/2016 |

* cited by examiner

*Primary Examiner* — Than Nguyen
(74) *Attorney, Agent, or Firm* — J.C. PATENTS

(57) ABSTRACT

A memory device and a detection method for detecting a defeated status of a memory cell are provided. The memory device is, for example a three dimensional NAND flash memory circuit, and provides a storage media with high-performance and high-capacity. The detection method includes: searching status data stored in a page buffer, finding set status memory cells, and acquiring set status data; storing status data in a storage device; setting one of latches in the page buffer as a selected latch after a first half of the levels of the programming operation have been completed; storing each setting data in the selected latch; and check each set status memory cell according to the each set status data to determine whether the set status memory cell is maintained in the set status.

19 Claims, 6 Drawing Sheets

MEMORY DEVICE AND DETECTION METHOD FOR DEFEATED STATUS OF MEMORY CELL

BACKGROUND

Technical Field

The disclosure relates to a memory device and a detection method for a defeated status of a memory cell, and particularly relates to a memory device and a detection method for a defeated status of a memory cell capable of avoiding data loss.

Description of Related Art

Referring to FIG. 1, FIG. 1 is a diagram illustrating a status in which a word line in a conventional flash memory is damaged. In the field of flash memories, when a programming operation is executed, a validation operation needs to be performed on a memory cell to be programmed to verify whether data are correctly written into the memory cell. In addition, if it is found that data are unable to be correctly written into the memory cell, the data need to be written in another memory page to prevent the data from losing.

Conventionally, after a word line WLn is programmed for multiple times, the word line WLn may be short-circuited with adjacent word line(s) WLn+1 and/or WLn−1 due to multiple voltage biasing operations on the word line WLn. Such phenomenon is referred to as a defeated phenomenon. In such phenomena, data cannot be restored by a programming validation operation and the technique of error correcting code (ECC).

SUMMARY

A memory device and a detection method for a defeated status of a memory cell are provided, capable of effectively detecting a defeated memory cell due to over-programming.

The detection method for a defeated status of a memory cell according to an aspect of the disclosure includes: search a plurality of status data stored in the page buffer, finding a plurality of set status memory cells in a set status among a plurality of memory cells, and acquire a plurality of set status data respectively corresponding to the set status memory cells; storing status data in a storage device; executing a programming operation of a plurality of levels, and setting one of a plurality of latches in the page buffer as a selected latch after a first half of the levels of the programming operation have been completed; causing the storage device to store each setting data in the selected latch; and checking each of the set status memory cells according to the each of the set status data to determine whether the each of the set status memory cells is maintained in the set status.

The memory device according to an aspect of the disclosure includes a page buffer, a storage device, and a controller. The page buffer is coupled to at least one bit line of a memory block, and includes latches and a bit line bias and sensing circuit. The storage device is coupled to the page buffer. The controller is coupled to the storage device and the page buffer, and configured to perform the detection method for the defeated status of the memory cell above.

Based on the above, according to the embodiments of the disclosure, the operation for detecting the defeated status of the memory cell is executed during the programming operation. According to the embodiments of the disclosure, by using the set status memory cell detected as the set status, after the programming operation, whether the set status memory cell is maintained in the set status is determined, thereby learning whether the set status memory cell is a defeated memory cell. Moreover, the memory device according to the embodiments of the disclosure is able to mask the defeated memory cells to prevent the defeated memory cells from being used erroneously, which causes data loss, thereby facilitating data security.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
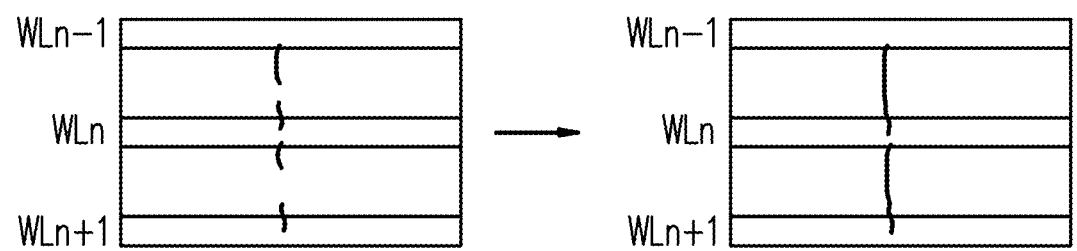
FIG. 1 is a diagram illustrating a state in which a word line is damaged in a conventional flash memory.
Figure 2:
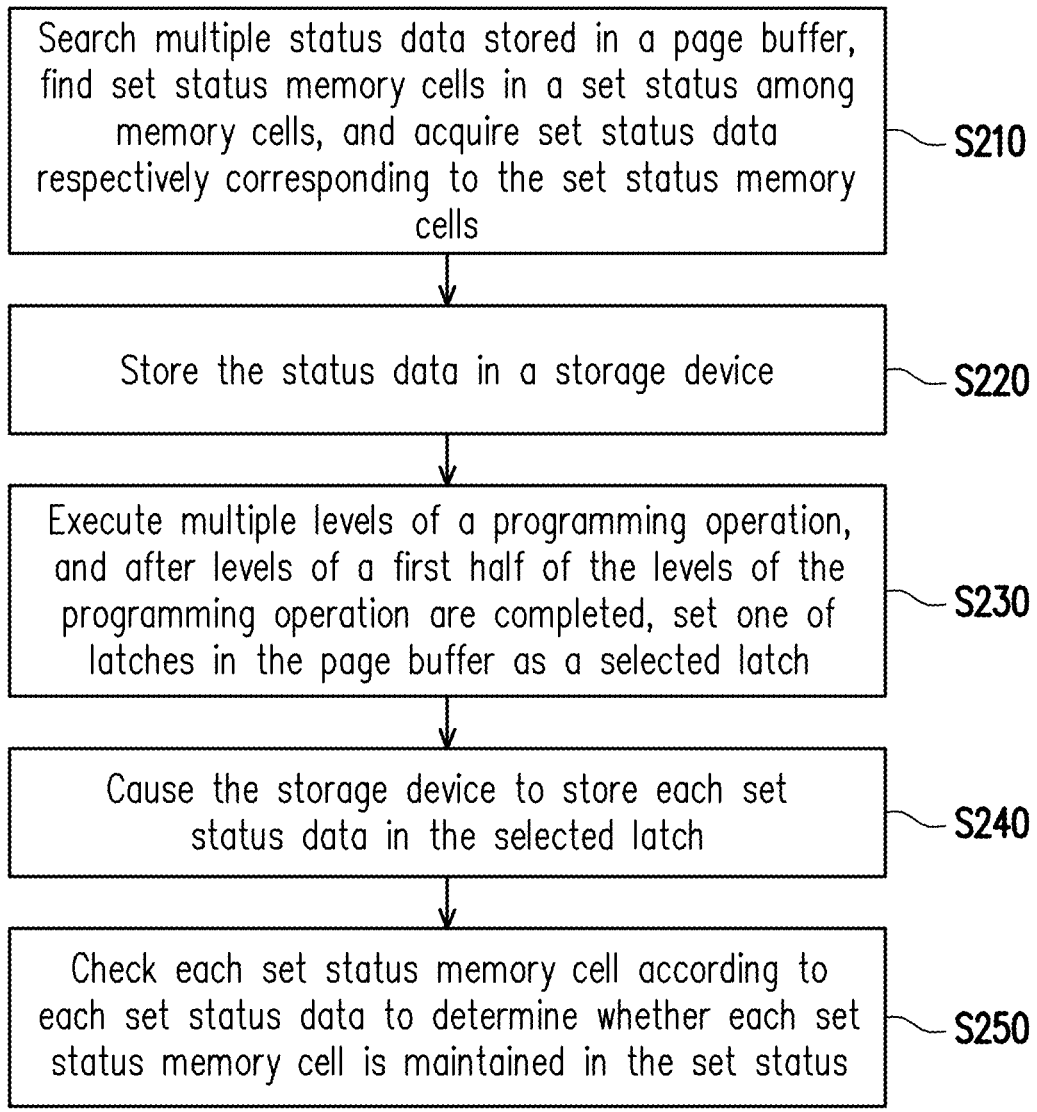
FIG. 2 is a flowchart illustrating a detection method for a defeated status of a memory cell according to an embodiment of the disclosure.

Referring to FIG. 2, FIG. 2 is a flowchart illustrating a detection method for a defeated status of a memory cell according to an embodiment of the disclosure. The operational flow of the embodiment is executed together with a programming operation of a memory device. In FIG. 2, in Step S210, a controller of a memory device may search multiple status data stored in a page buffer, find multiple set status memory cells in a set status among memory cells, and acquire multiple set status data respectively corresponding to the set status memory cells that are searched. Then, in Step S220, the controller may store the set data in a storage device.

Then, in Step S230, the controller may execute a programming operation of multiple levels of the memory device. In the programming operation of multiple levels, the controller may execute the programming operation based on a level sequence set in advance. In addition, after the first half of the levels of the programming operation have been completed, the controller may set one of multiple latches in a page buffer as a selected latch, where the selected latch is a free latch currently. Referring the table in the following, the table illustrates the data stored in the latch corresponding to each level in the case of three bits, for example.

| Status | Erase | A | B | C | D | E | F | G |
|---|---|---|---|---|---|---|---|---|
| L1 | 1 | 1 | 1 | 1 | 0 | 0 | 0 | 0 |
| L2 | 0 | 1 | 1 | 0 | 0 | 1 | 1 | 0 |
| L3 | 1 | 1 | 0 | 0 | 0 | 0 | 1 | 1 |

In the above table, in correspondence with different statuses of the memory cells, the latches L1 to L3 may respectively store multiple data. Taking the memory cell corresponding to the status of "Erase", the latches L1 to L3 may respectively store logic values 1, 0, 1. Taking a programming level A as another example, the latches L1 to L3 may respectively store logic values 1, 1, 1. The rest may be deduced with reference to the above table.

According to the above table, in the programming operation of the memory cells of the levels D to G after the programming operation of the memory cell of the level C is completed, the data stored in the latch L1 are all logic value 0 without any change. In other words, in the subsequent programming operation, the latch L1 makes no contribution to the level recognition in the programming operation. Therefore, after the half of the levels of the programming operation are completed, the latch L1 may be set as a selected latch.

Then, in Step S240, the controller may store each set status data in the storage device to the corresponding selected latch. Then, the controller may resume the subsequent half of the levels of the programming operation.

In Step S250, after all the levels of the programming operation are completed, the controller may check each corresponding set status memory cell by using each set status data stored in the selected latch, so as to determine whether each set status memory cell is still maintained in the set status. The set status memory cell being determined as being maintained in the set status indicates that the memory cell does not suffer from data loss due to a bit line defeated status. Comparatively, the set status memory cell being determined as not being maintained in the set status indicates that, during programming, the set status memory cell has suffered from data loss due to a bit line defeated status or a bit line interfered status.

Moreover, when the situation in which the set status memory cell is determined as not being maintained in the set status, the controller may set the corresponding set status memory cell as a defeated memory cell and mask the defeated memory cell from being used, so as to prevent data loss from occurring. In addition, in the embodiment, if the accumulated quantity of the masked defeated memory cells exceeds a threshold set in advance, the controller may mask the entire memory cell block from being used, so as to ensure data accuracy.

It should be noted that the set status may be an erase status. Alternatively, in an embodiment of the disclosure, the set status may also be a programming status of any level and is not particularly limited.

Figure 3A:
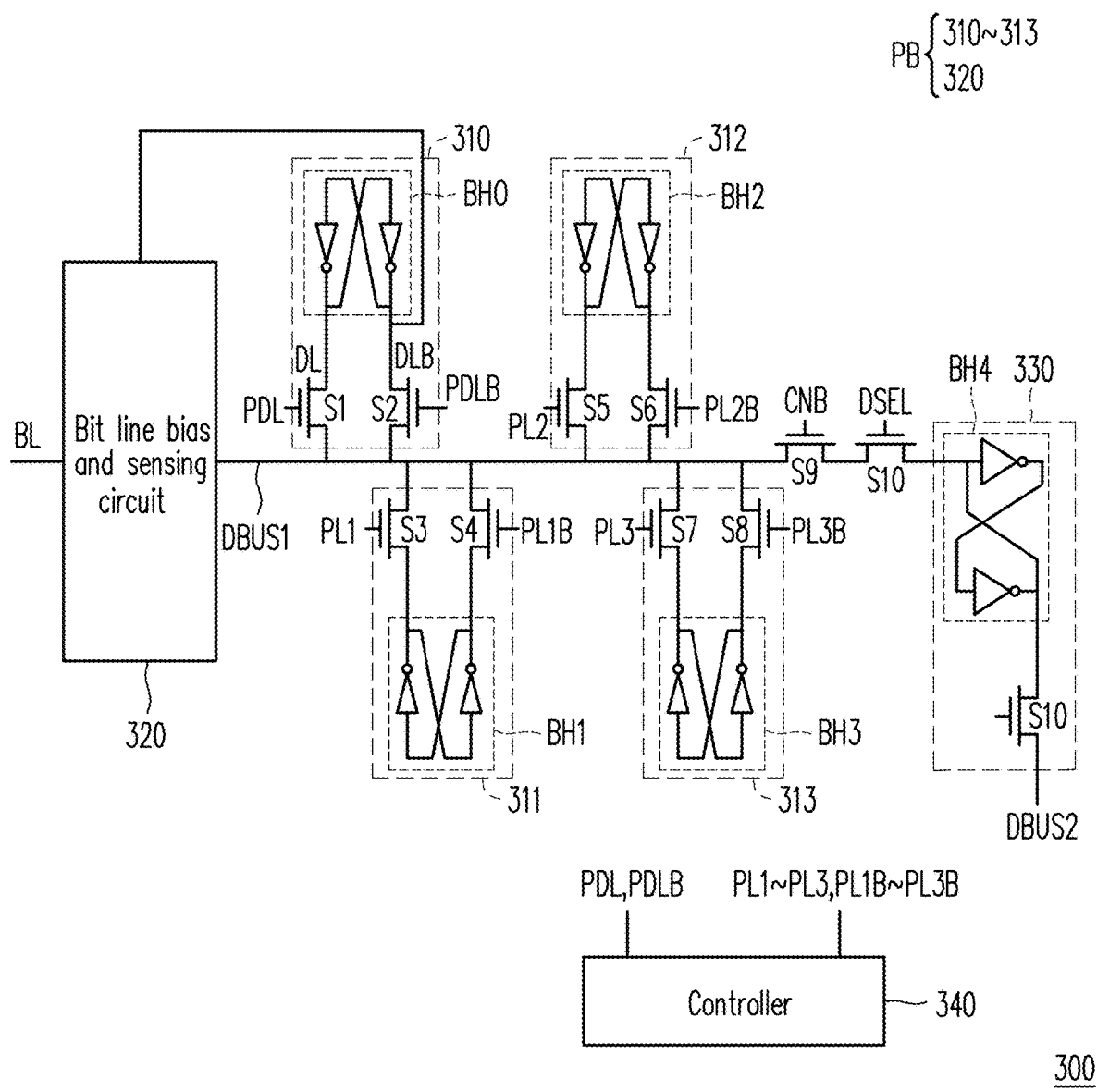
FIG. 3A is a schematic view illustrating a memory device according to an embodiment of the disclosure.

Referring to FIG. 3A, FIG. 3A is a schematic view illustrating a memory device according to an embodiment of the disclosure. A memory device 300 includes a page buffer PB, a storage device 330, and a controller 340. The page buffer PB is coupled to a bit line BL of a memory block. The page buffer PB includes latches 310 to 313 and a bit line bias and sensing circuit 320. The latches 310 to 313 are commonly coupled to a bus DBUS 1. The latches 310 to 313 are coupled to the bit line bias and sensing circuit 320 via the bus DBUS 1.

Specifically, the latches 310 to 313 are respectively provided with bus holders BH0 to BH3. The bus holder BH0 is coupled to the bus DBUS1 via switches S1 to S2. The bus holder BH1 is coupled to the bus DBUS1 via switches S3 to S4. The bus holder BH2 is coupled to the bus DBUS1 via switches S5 to S6. The bus holder BH3 is coupled to the bus DBUS1 via switches S7 to S8. The switches S1, S2 are respectively controlled by control signals PDL and PDLB.

The switches S3, S5, S7 are respectively controlled by control signals PL1 to PL3. The switches S4, S6, S8 are respectively controlled by control signals PL1B to PL3B.

The bus DBUS1 may be coupled to the storage device 330 via switches S9, S10. The switches S9, S10 are respectively controlled by control signals CNB and DSEL.

By sequentially turning on the switches S9, S10, the data in the bus DBUS may be transmitted to the storage device 330. Comparatively, by sequentially turning on the switches S10, S9, the data stored in the storage device 330 may be transmitted to the bus DBUS1. In addition, when data are transferred among the latches 310 to 313, such as the case where data are transferred from the latch 310 to the latch 311, for example, the switches S1, S2 may be firstly turned on, and data DL, DLB that are differential signals to each other in the bus holder BH0 are transferred to the bus DBUS1. Then, the switches S1, S2 are turned off, and the switches S3, S4 are turned on, so that the data in the bus DBUS1 are written to the bus holder BH1 in the latch 311.

Moreover, the controller 340 may be configured to generate multiple control signals PDL, PDLB, PL1 to PL3, and PL1B to PL3, and is configured to conduct a data transfer operation between the page buffer PB and the storage device 330.

In addition, the bit line bias and sensing circuit 320 may receive the set status data (e.g., the data DLB) provided by the latch 310 to bias the bit line BL. In addition, when the set status data are erase status data, the data DLB is, for example, the logic value 0, and the bit line bias and sensing circuit 320 may bias the corresponding bit line to a first voltage value. Comparatively, when the set status data are not the erase status data, the data DLB is, for example, a logic value 1, and the bit line bias and sensing circuit 320 may bias the corresponding bit line to a second voltage value, the first voltage value being higher than the second voltage value. In the embodiment, the latch 310 may be an output latch.

The storage device 330 may be a cache device. In the embodiment, the storage device 330 includes a bus holder BH4. The bus holder BH4 may be coupled to the bus DBUS1 via the switch S10. In the embodiment, the bus holder BH4 may be further coupled to another bus DBUS2 via the switch S10. In addition, the status data may be directly stored in the bus holder BH4. Alternatively, the status data may be stored in another storage device in advance. When needed to be read, the status data may be transmitted from another bus DBUS2 to the bus holder BH4 for temporary storage via the switch S10, and may then be provided to the bus DBUS1 via the switch 10.

In correspondence with the operational flow of FIG. 2 of the disclosure, in Step S220, the latch 310 as the output latch may store the set status data DL as the erase status data, for example, in the storage device 330 before the programming operation, so as to prevent the erase status data from being lost. In Step S230, after a first half of the levels of the programming operation are completed, the latch 311 may be set as the selected latch. In Step S240, the storage device 330 may store the set status data (erase status data) in the selected latch (i.e., the latch 311).

In Step 250, the selected latch (the latch 311) may transfer the stored erase status data to the output latch (the latch 310). In addition, the output latch (the latch 310) transmits the erase status data to the bit line bias and sensing circuit 320, the bit line bias and sensing circuit 320 may apply a high-voltage bias voltage to the bit line BL according to the erase status data and perform a sensing operation on the memory cell in the erase status. Accordingly, whether the memory cell in the erase status is maintained in the erase status is learned.

Figure 3B:
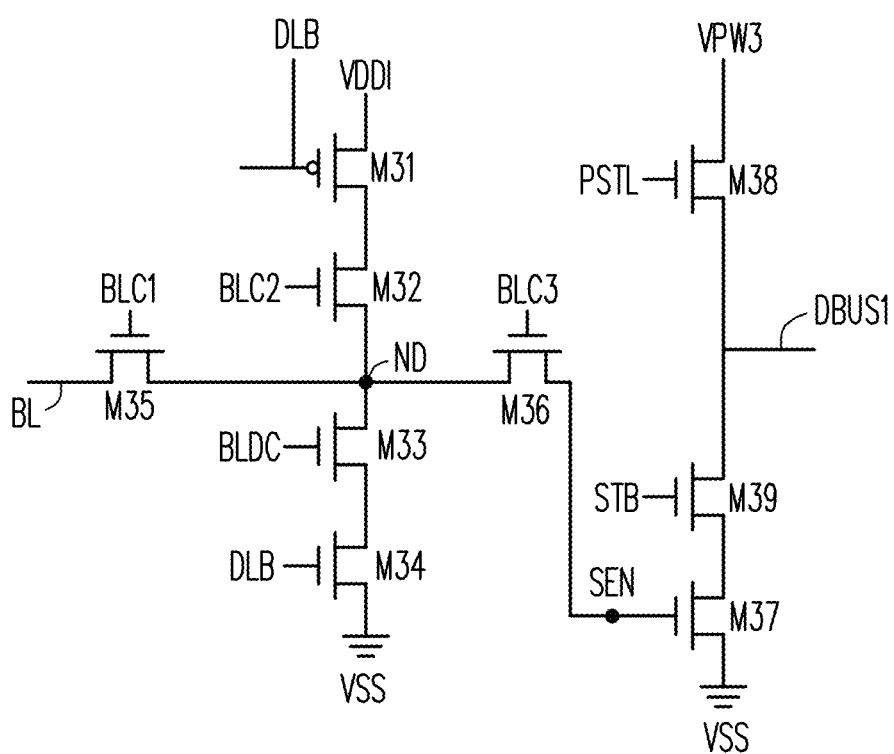
FIG. 3B is a schematic view illustrating a bit line bias and sensing circuit according to an embodiment of the disclosure.

Referring to FIG. 3B, FIG. 3B is a schematic view illustrating a bit line bias and sensing circuit according to an embodiment of the disclosure. The bit line bias and sensing circuit 300 includes pull-up transistors M31, M32 and pull-down transistors M33, M34. The pull-up transistor M31 and the pull-up transistor M32 are sequentially connected in series between a voltage VDDI and a node ND. The pull-down transistor M34 and the pull-down transistor M33 are sequentially connected in series between a reference ground end VSS and the node ND. When the pull-up transistor M31 is controlled by the data DLB and the data DLB is at the logic value 0 (indicating the erase status), the voltage of the node ND is pulled up to the voltage VDDI (at this time, the transistor M32 is turned on according to a control signal BLC2). When the pull-down transistor M34 is controlled by the data DLB and the data DLB is at the logic value 1 (indicating not the erase status), the voltage of the node ND is pulled down to the ground voltage (at this time, the transistor M33 is turned on according to a control signal BLDC).

The node ND is coupled to the bit line BL through a transistor M35. The transistor M35 is turned on according to a control signal BLC1, and provides a voltage at the node ND to bias the bit line BL. Accordingly, a sensing operation may be performed on whether the set status memory cell is maintained at the set status (erase status).

In addition, the node ND is coupled to the control end of a transistor M37 via a transistor M36. When the bit line BL is biased to the voltage VDDI that is relatively high, a sensing signal SEN of the control end of the transistor M37 corresponds to the voltage VDDI to turn on the transistor M37. Alternatively, when the bit line BL is biased to the ground voltage that is relatively low, the sensing signal SEN of the control end of the transistor M37 corresponds to the ground voltage to turn off the transistor M37. The bit line BL may also be charged to another voltage level lower than the voltage VDDI which is decided by voltage levels of the control signals BLC1 and BLC2.

Besides, transistors M38 and M39 are coupled in series between a voltage VPW3 and the transistor M37. The transistors M38 and M39 are respectively controlled by signals PSTL and STB. The transistor M38 may be turned on according to the signal PSTL and provides the voltage VPW3 to charge the data bus DBUS1. In this embodiment, a voltage value of the voltage VPW3 may be different from a voltage value of the voltage VDDI.

Figure 4A:
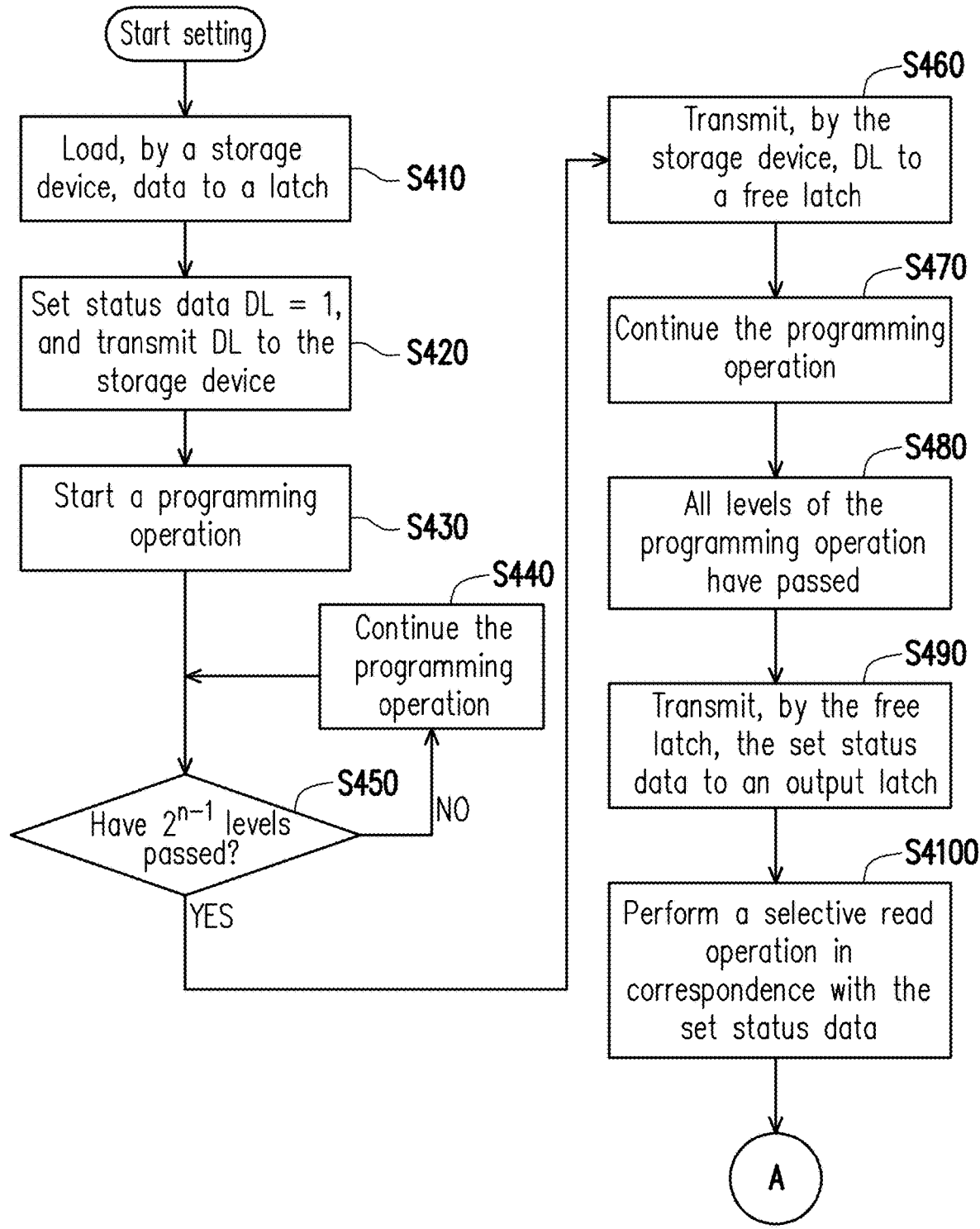
FIGS. 4A and 4B are flowcharts illustrating a programming operation according to an embodiment of the disclosure.
Figure 4B:
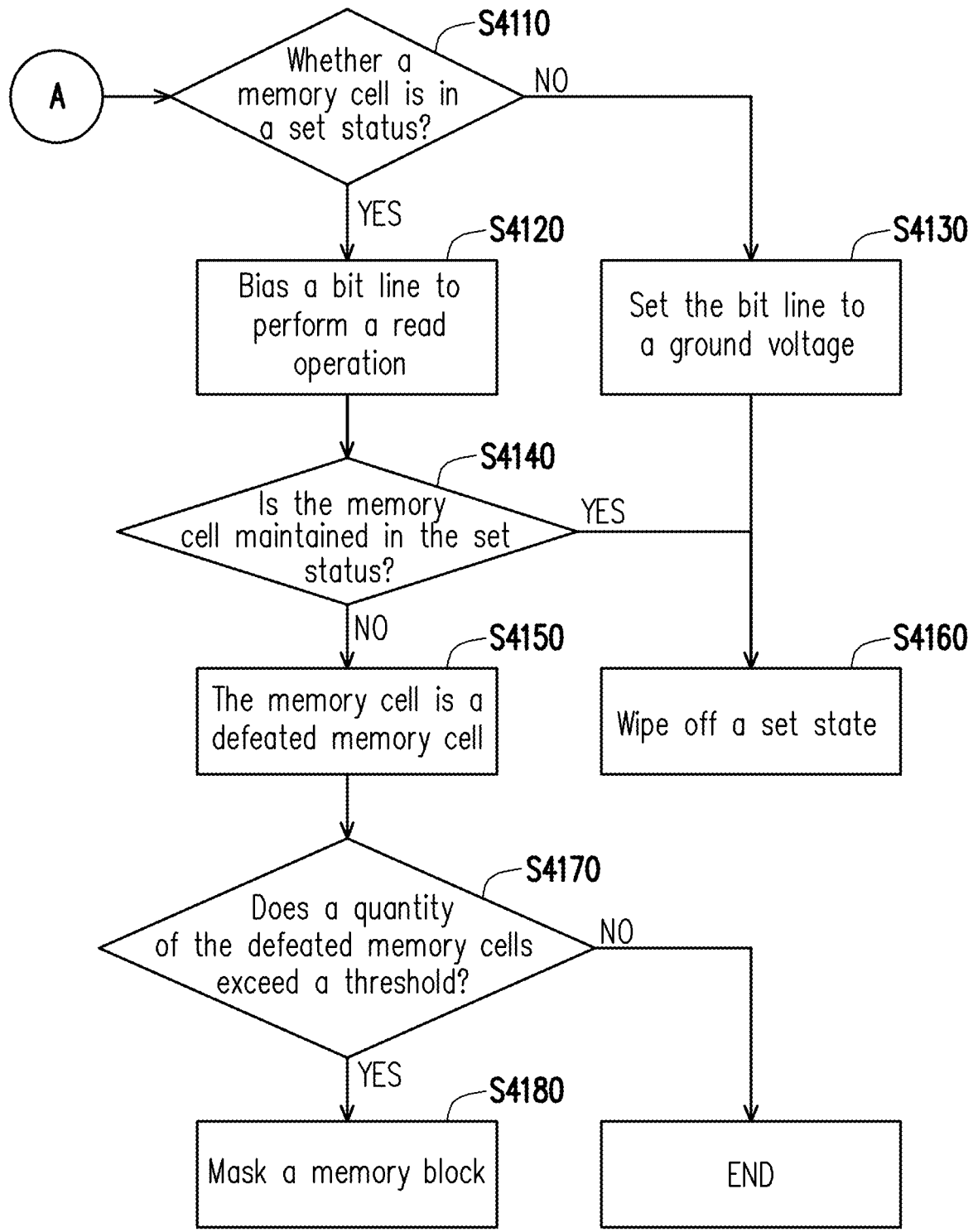

In the following, referring to FIGS. 4A and 4B, FIG. 4A and FIG. 4B are flowcharts of a programming operation according to an embodiment of the disclosure. Firstly, a setting operation is executed for the programming operation of the memory device. In FIG. 4A, at Step S410, the data of the latch in the page buffer may be loaded into the storage device. In Step S420, the data DL may be set as DL=1, and the status data DL is transmitted to the storage device. In Step S430, the programming operation may be started, and whether $2^{n-1}$ levels of the programming operations have been completed is determined in Step S450, n being the number of levels of data stored in the memory cell.

When a determination result of Step S450 indicates NO, Step S440 is executed to keep executing the programming operation, and Step S450 is executed again, until the determination result of Step S450 indicates YES.

Then, in Step S460, the storage device transmits the status data DL=1 to the selected latch, and the subsequent programming operation is kept being executed through Step S470. In Step S480, when all the levels of the programming operation have passed, the selected latch transmits the set status data to the output latch. At Step S4110, in correspondence with the set status data, the memory device may execute a selective read operation, and the flow enters a node A.

In FIG. 4B, following the node A in FIG. 4A, in Step S4110, the controller of the memory device may determine whether the memory cell is originally recorded as the set status. If a determination result indicates YES, Step S4120 may be executed. Alternatively, if the determination result indicates NO, Step S4130 may be executed.

In Step S4130, the bit line may be set to a ground voltage, and the set status is wiped off in Step S4160.

In Step S4120, the bit line may be biased to a high voltage to execute a read operation of the memory cell, and whether the memory cell is maintained in the set status is determined in Step S4140. If a determination result indicates YES, Step S4160 is executed. Alternatively, if the determination result indicates NO, Step S4150 is executed.

In Step S4150, the memory cell is set as a defeated memory cell, and in Step S4170, the controller may count whether the accumulated quantity of the defeated memory cells exceeds a threshold. When the accumulated quantity of the defeated memory cells exceeds the threshold, the controller may mask the corresponding memory block from being used. When the accumulated quantity of the defeated memory cells does not exceed the threshold, the flow may be ended.

In view of the foregoing, according to the embodiments of the disclosure, the status information of the set status memory cell is stored in the selected latch after the first half of the levels of the programming operation are completed. When all the levels of the programming operation are completed, whether the set status memory cell is maintained in the set status is sensed according to the set status data. In this way, whether the memory cell is a defeated memory cell is determined. In this way, whether the memory cell is in the defeated status can be accurately sensed, and data loss can be effectively avoided.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A detection method for a defeated status of a memory cell, the detection method comprising:
   searching a plurality of status data stored in a page buffer, finding a plurality of set status memory cells in a set status among a plurality of memory cells, and acquiring a plurality of set status data respectively corresponding to the set status memory cells;
   storing the set status data in a storage device;
   executing a programming operation of a plurality of levels, and setting one of a plurality of latches in the page buffer as a selected latch after a first half of the levels of the programming operation have been completed;
   causing the storage device to store each of the set status data in the selected latch; and checking each of the set status memory cells according to the each of the set status data to determine whether the each of the set status memory cells is maintained in the set status.

2. The detection method as claimed in claim 1, further comprising:
determining the each of the set status memory cells as a defeated memory cell in response to the each of the set status memory cells not being maintained in the set status.

3. The detection method as claimed in claim 2, further comprising:
calculating an accumulated quantity of the respective set status memory cells being the defeated memory cells, and, in response to the accumulated quantity exceeding a threshold, setting a memory block corresponding to the respective set status memory cells as a defeated memory block.

4. The detection method as claimed in claim 1, wherein the each of the status data is erase status data or programming status data of different levels.

5. The detection method as claimed in claim 1, wherein setting one the latches in the page buffer as a selected latch comprises:
setting each of the latches whose stored data do not change in a second half of the levels of the programming operation as the selected latch.

6. The detection method as claimed in claim 1, wherein checking the each of the set status memory cells according to the each of the set status data to determine whether the each of the set status memory cells is maintained in the set status comprises:
causing the selected latch to provide the each of the set status data to a bit line bias and sensing circuit; and
causing the bit line bias and sensing circuit to check whether the each of the set status memory cells is maintained in the set status according to the each of the set status data.

7. The detection method as claimed in claim 6, further comprising:
in response to the each of the set status data being erase status data, the bit line bias and sensing circuit biases a corresponding bit line to a first voltage value in accordance with the each of the set status data; and
in response to the each of the set status data being not the erase status data, the bit line bias and sensing circuit biases the corresponding bit line to a second voltage value in accordance with the each of the set status data, wherein the first voltage value is higher than the second voltage value.

8. A memory device, comprising:
a page buffer, coupled to at least one bit line of a memory block, and comprising a plurality of latches and a bit line bias and sensing circuit;
a storage device, coupled to the page buffer; and
a controller, coupled to the storage device and the page buffer, and configured to;
search a plurality of status data stored in the page buffer, finding a plurality of set status memory cells in a set status among a plurality of memory cells, and acquire a plurality of set status data respectively corresponding to the set status memory cells;
store the status data in the storage device;
execute a programming operation of a plurality of levels, and set one of a plurality of latches in the page buffer as a selected latch after a first half of the levels of the programming operation have been completed;
cause the storage device to store each of the set status data in the selected latch; and
check each of the set status memory cells according to the each of the set status data to determine whether the each of the set status memory cells is maintained in the set status.

9. The memory device as claimed in claim 8, wherein the controller is further configured to:
determine the each of the set status memory cells as a defeated memory cell in response to the each of the set status memory cells not being maintained in the set status.

10. The memory device as claimed in claim 9, wherein the controller is further configured to:
calculate an accumulated quantity of the respective set status memory cells being the defeated memory cells, and, in response to the accumulated quantity exceeding a threshold, set a memory block corresponding to the respective set status memory cells as a defeated memory block.

11. The detection method as claimed in claim 8, wherein the each of the status data is erase status data or programming status data of different levels.

12. The memory device as claimed in claim 8, wherein the controller is further configured to:
set each of the latches whose stored data do not change in a second half of the levels of the programming operation as the selected latch.

13. The memory device as claimed in claim 8, wherein the controller is further configured to:
cause the selected latch to provide the each of the set status data to the bit line bias and sensing circuit; and
cause the bit line bias and sensing circuit to check whether the each of the set status memory cells is maintained in the set status according to the each of the set status data.

14. The memory device as claimed in claim 8, wherein in response to the each of the set status data being erase status data, the bit line bias and sensing circuit biases a corresponding bit line to a first voltage value in accordance with the each of the set status data; and in response to the each of the set status data being not the erase status data, the bit line bias and sensing circuit biases the corresponding bit line to a second voltage value in accordance with the each of the set status data, wherein the first voltage value is higher than the second voltage value.

15. The memory device as claimed in claim 8, wherein the latches are commonly coupled to a bus, and an output latch of the latches is coupled to the bit line bias and sensing circuit and provides the each of the set status data to the bit line bias and sensing circuit.

16. The memory device as claimed in claim 15, wherein the storage device comprises:
a bus holder, coupled to the bus through a first switch, and coupled to a database through a second switch.

17. The memory device as claimed in claim 15, wherein the bit line bias and sensing circuit comprises:
a pull-up transistor, coupled between a first voltage and a first node; and
a pull-down transistor, coupled between a second voltage and the first node,
wherein the first node is coupled to the bit line through a first switch, the pull-up transistor or the pull-down transistor is turned on in accordance with the set status data to execute a bias operation of the bit line, and the first voltage is higher than the second voltage.

18. The memory device as claimed in claim 17, wherein the bit line bias and sensing circuit further comprises:

a sensing switch, coupled to the first node through a second switch and coupled in series to a transistor,
wherein the transistor is coupled in series to the bus, and, in response to the bias operation being completed, the sensing switch is coupled to the bit line through the second switch and start a sensing operation.

19. The memory device as claimed in claim 8, wherein the memory block is an NAND flash memory block.

* * * * *